United States Patent
Boyd et al.

(10) Patent No.: US 8,265,484 B2
(45) Date of Patent: Sep. 11, 2012

(54) RF SIGNAL TRANSPORT OVER PASSIVE OPTICAL NETWORKS

(75) Inventors: Edward W. Boyd, Petaluma, CA (US); Weidong Rick Li, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 280 days.

(21) Appl. No.: 12/785,006

(22) Filed: May 21, 2010

(65) Prior Publication Data
US 2011/0142447 A1 Jun. 16, 2011

Related U.S. Application Data

(60) Provisional application No. 61/286,597, filed on Dec. 15, 2009.

(51) Int. Cl.
*H04J 14/00* (2006.01)
*H04B 10/00* (2006.01)
(52) U.S. Cl. ............... 398/74; 398/72; 398/115
(58) Field of Classification Search .......... 398/58, 398/66–68, 70–72, 74, 115
See application file for complete search history.

(56) References Cited

U.S. PATENT DOCUMENTS

| 8,032,916 B2 * | 10/2011 | Oyadomari et al. .......... 725/119 |
| 2010/0083330 A1 * | 4/2010 | Bernstein et al. .............. 725/111 |
| 2012/0066724 A1 * | 3/2012 | Zussman .......................... 725/65 |

* cited by examiner

*Primary Examiner* — Dalzid Singh
(74) *Attorney, Agent, or Firm* — Sterne, Kessler, Goldstein & Fox P.L.L.C.

(57) ABSTRACT

One embodiment provides an EPON for transporting RF signals. The system includes a reference clock, an ONU, and an OLT. The ONU includes a mechanism for receiving a frequency and phase-reference signal from the OLT, a mechanism for receiving an RF signal, an ADC for converting the RF signal into a digital signal using a sampling signal associated with the frequency and phase-reference signal, a mechanism for assembling at least a portion of the digital signal into a packet, a mechanism configured to timestamp the packet, and an optical transceiver. The OLT includes a mechanism for receiving the packet, a buffer, a delay mechanism configured to delay reading the received packet from the buffer for a predetermined amount of time, and a DAC for converting the digital signal included in the packet back to RF domain using a clock signal associated with the frequency and phase-reference signal.

22 Claims, 6 Drawing Sheets

RF SIGNAL TRANSPORT OVER PASSIVE OPTICAL NETWORKS

CROSS REFERENCE TO RELATED APPLICATIONS

Figure 1:
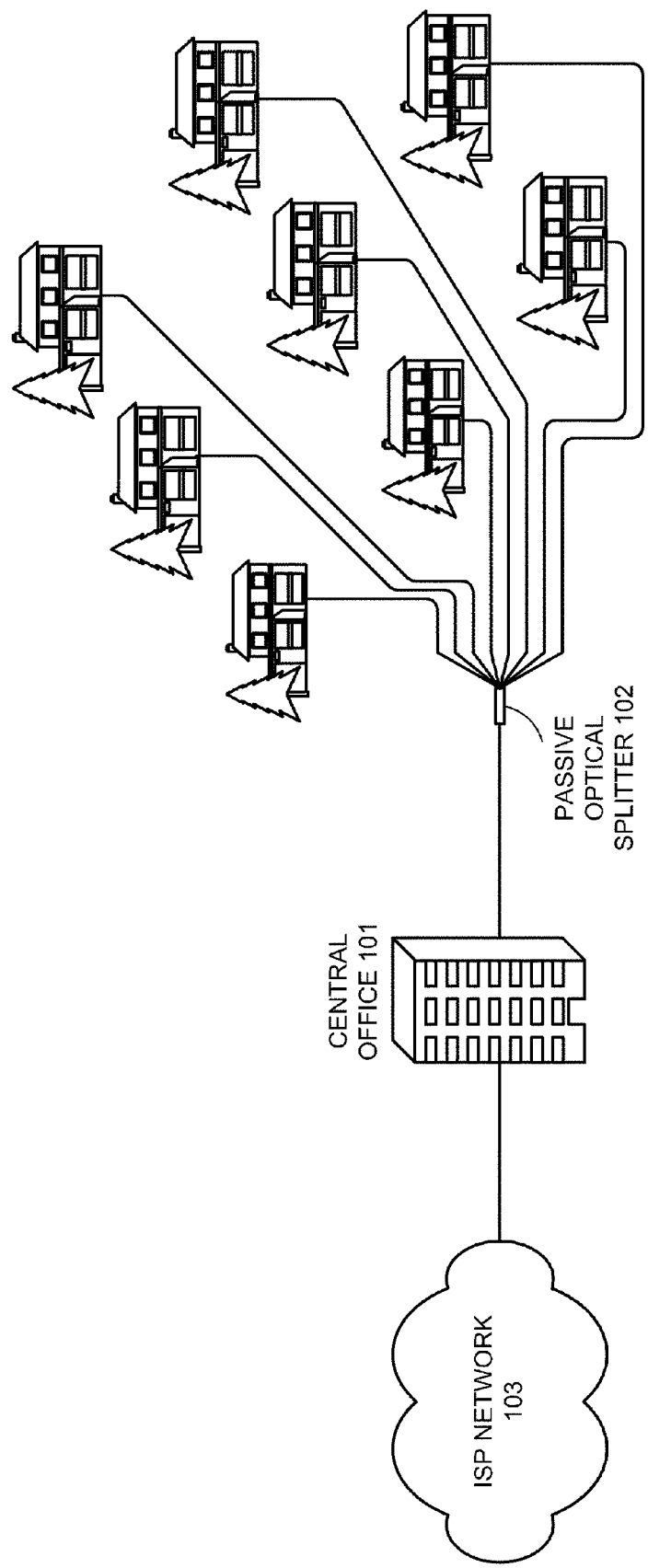

This application claims the benefit of U.S. Provisional Application No. 61/286,597, filed Dec. 15, 2009, which is incorporated herein by reference in its entirety.

The subject matter of this application is related to the subject matter of U.S. patent application Ser. No. 12/574,083, entitled "Synchronization Transport Over Passive Optical Networks," by inventors Edward W. Boyd and Hidehiko Shibuya, filed Oct. 6, 2009, the disclosure of which is incorporated by reference in its entirety herein.

BACKGROUND OF THE INVENTION

1. Field of the Invention

This disclosure is generally related to a passive optical network (PON). More specifically, this disclosure is related to transporting a radio frequency (RF) signal over a PON.

2. Background Art

In order to keep pace with increasing Internet traffic, network operators have widely deployed optical fibers and optical transmission equipment, substantially increasing the capacity of backbone networks. A corresponding increase in access network capacity is also needed to meet the increasing bandwidth demand of end users for triple play services, including Internet protocol (IP) video, high-speed data, and packet voice. Even with broadband solutions, such as digital subscriber line (DSL) and cable modem (CM), the limited bandwidth offered by current access networks still presents a severe bottleneck in delivering large bandwidth to end users.

Among different competing technologies, passive optical networks (PONs) are one of the best candidates for next-generation access networks. With the large bandwidth of optical fibers, PONs can accommodate broadband voice, data, and video traffic simultaneously. Such integrated service is difficult to provide with DSL or CM technology. Furthermore, PONs can be built with existing protocols, such as Ethernet and ATM, which facilitate interoperability between PONs and other network equipment.

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers (see FIG. 1). Note that other topologies are also possible, including ring and mesh topologies.

Transmissions within a PON are typically performed between an optical line terminal (OLT) and optical network units (ONUs). The OLT controls channel connection, management, and maintenance, and generally resides in the central office. The OLT provides an interface between the PON and a metro backbone, which can be an external network belonging to, for example, an Internet service provider (ISP) or a local exchange carrier. For EPON, the interface is an Ethernet interface. The ONU terminates the PON and presents the native service interfaces to the end users; the ONU can reside in the customer premises and couple to the customer's network through customer-premises equipment (CPE).

FIG. 1 illustrates a passive optical network including a central office and a number of customers coupled through optical fibers and a passive optical splitter (prior art). A passive optical splitter 102 and optical fibers couple the customers to a central office 101. Multiple splitters can also be cascaded to provide the desired split ratio and a greater geographical coverage. Passive optical splitter 102 can reside near end-user locations to minimize the initial fiber deployment costs. Central office 101 can couple to an external network 103, such as a metropolitan area network operated by an ISP. Although FIG. 1 illustrates a tree topology, a PON can also be based on other topologies, such as a logical ring or a logical bus. Note that, although in this disclosure many examples are based on EPONs, embodiments of the present invention are not limited to EPONs and can be applied to a variety of PONs, such as ATM PONs (APONs), Broadband PONs (BPONs), gigabit PONs (GPONs), and wavelength division multiplexing (WDM) PONs.

In order to compete with other service providers, multiple system operators (MSOs), which traditionally provide cable television (CATV) services to their subscribers, are also developing new solutions that can leverage their networks and subscriber base to create profitable and differentiated services. Nowadays, many MSOs implement EPON solutions that can deliver triple-play services to subscribers. However, these EPON solutions need to be able to support existing MSO service-delivery architecture and equipment. For example, it is desirable to allow the subscribers to use the same set-top box (STB) used in cable settings to transmit and receive analog signals via the EPON. Such STBs often use an out of band (OOB) analog signal for interactive services, including video on demand (VOD) and Pay TV (PTV) programs. Society of Cable Telecommunications Engineers (SCTE) 55-1 and 55-2 are two standard specifications for the transmission of OOB signals.

BRIEF SUMMARY OF THE INVENTION

One embodiment provides an Ethernet passive optical network (EPON) system for transporting radio frequency (RF) signals. The system includes a reference clock configured to generate a frequency and phase-reference signal, an optical network unit (ONU), and an optical line terminal (OLT) coupled to the reference clock. The ONU includes a reference-clock-receiving mechanism configured to receive the frequency and phase-reference signal from an OLT, an RF signal-receiving mechanism configured to receive an RF signal, an analog-to-digital converter (ADC) configured to convert the RF signal into a digital signal using a sampling signal associated with the frequency and phase-reference signal, a packet-assembling mechanism configured to assemble at least a portion of the digital signal into a packet, a timestamping mechanism configured to timestamp the packet, and an optical transceiver configured to transmit the packet to the OLT. The OLT includes a packet-receiving mechanism configured to receive the packet from the ONU, a buffer configured to buffer the received packet, a delay mechanism configured to delay reading the received packet from the buffer for a predetermined amount of time, and a digital-to-analog converter (DAC) configured to convert the digital signal included in the packet back to RF domain using a clock signal associated with the frequency and phase-reference signal, thereby facilitating RF signal transport over the EPON.

In a variation on the embodiment, the frequency and phase-reference signal is a 1 pulse-per-second (1 PPS) clock signal.

In a variation on the embodiment, the ONU further includes a frequency multiplier configured to multiply the frequency and phase-reference signal in order to generate the sampling signal provided to the ADC.

In a variation on the embodiment, the OLT further includes a frequency multiplier configured to multiply the frequency and phase-reference signal in order to generate the clock signal provided to the DAC.

In a further variation, wherein the sampling signal is optimized to match a carrier frequency of the RF signal.

In a variation on this embodiment, the timestamping mechanism comprises a counter configured to be reset by the frequency and phase-reference signal.

In a further variation, the received packet is placed at a location within the buffer based on the timestamp.

In a further variation, the received packet is read from the buffer at a time based on the packet timestamp and the predetermined amount of time delay.

In a further variation, the predetermined delay exceeds a maximum transmission delay between the ONU and the OLT.

In a variation on this embodiment, receiving the frequency and phase-reference signal from the OLT involves receiving an Operations, Administration, and Management (OAM) message.

BRIEF DESCRIPTION OF THE DRAWINGS/FIGURES

FIG. 1 presents a diagram illustrating a conventional cellular/mobile backhaul architecture (prior art).

Figure 2:
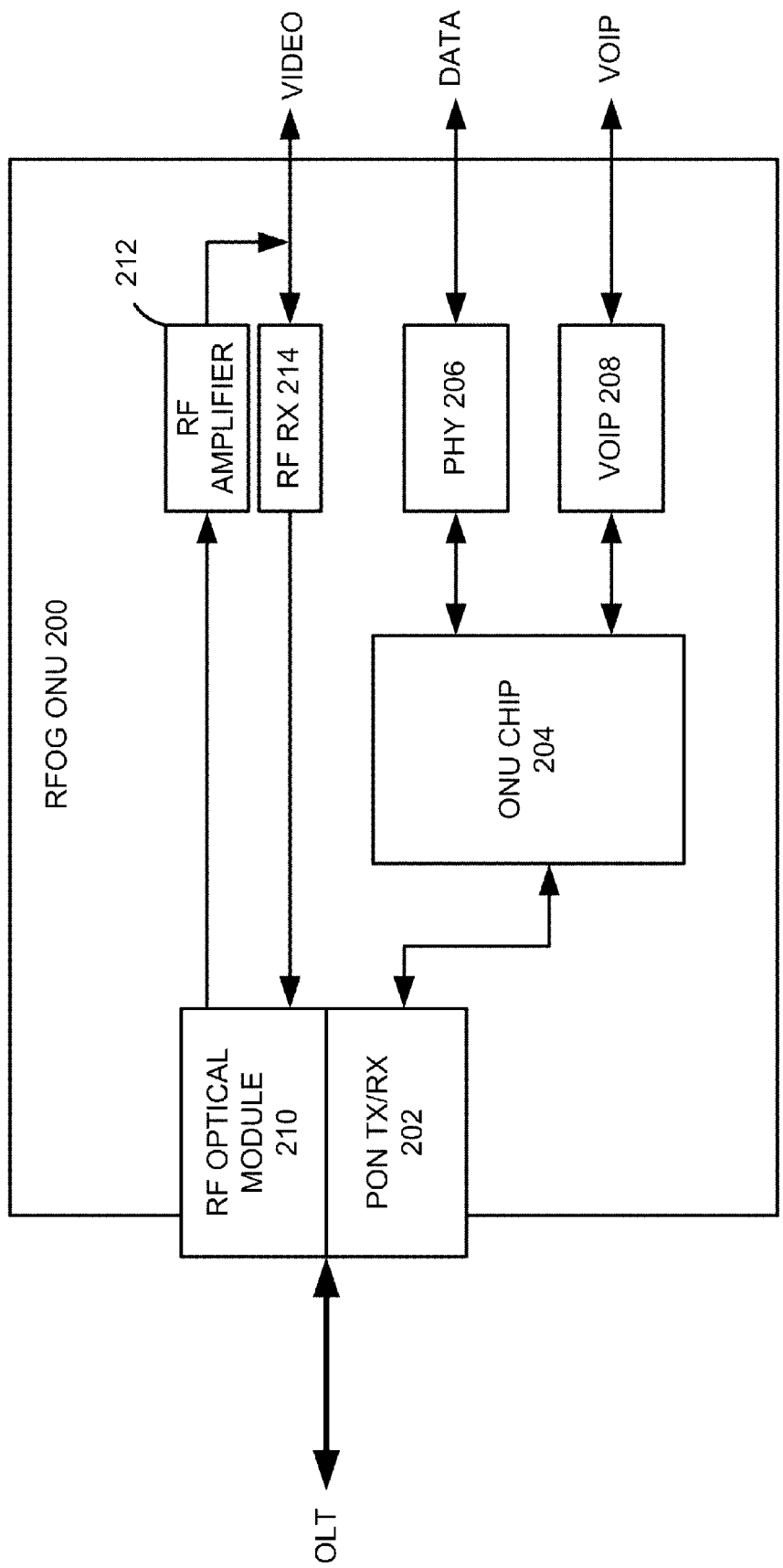

FIG. 2 presents a diagram illustrating an exemplary architecture of a Radio Frequency over Glass (RFoG) ONU.

Figure 3:
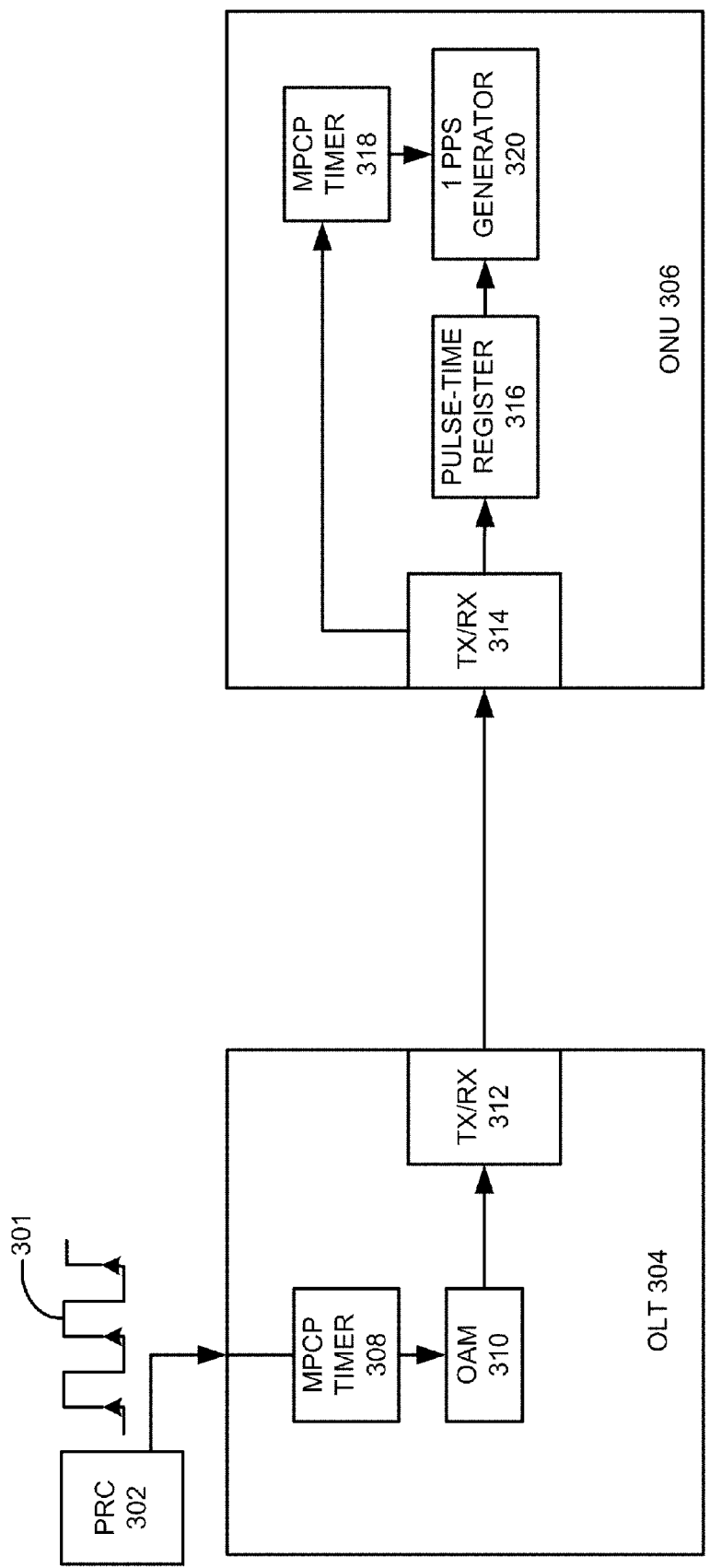

FIG. 3 presents a diagram illustrating the architecture of an exemplary EPON for clock transport in accordance with an embodiment of the present invention.

Figure 4:
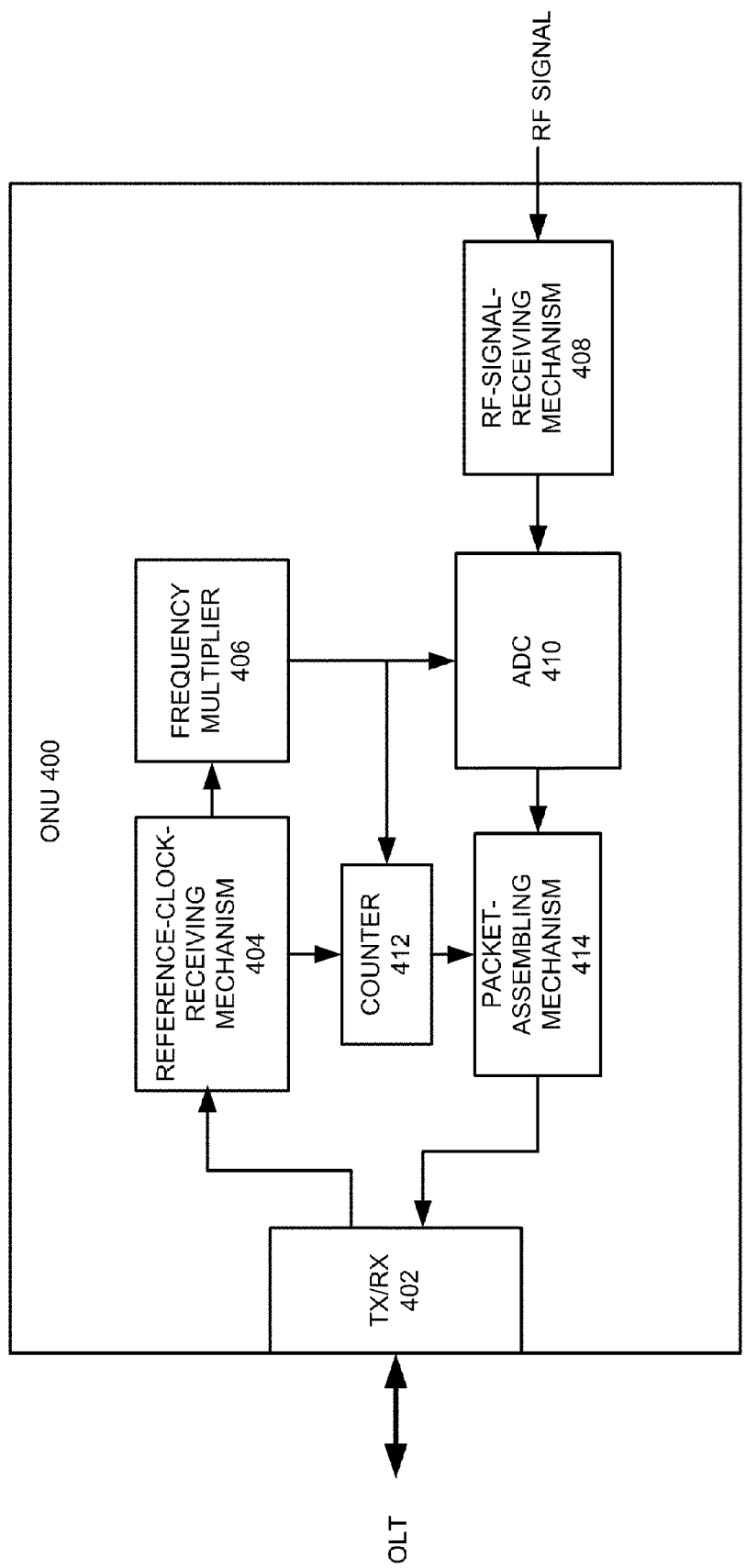

FIG. 4 presents a diagram illustrating the structure of an exemplary ONU in accordance with an embodiment of the present invention.

Figure 5:
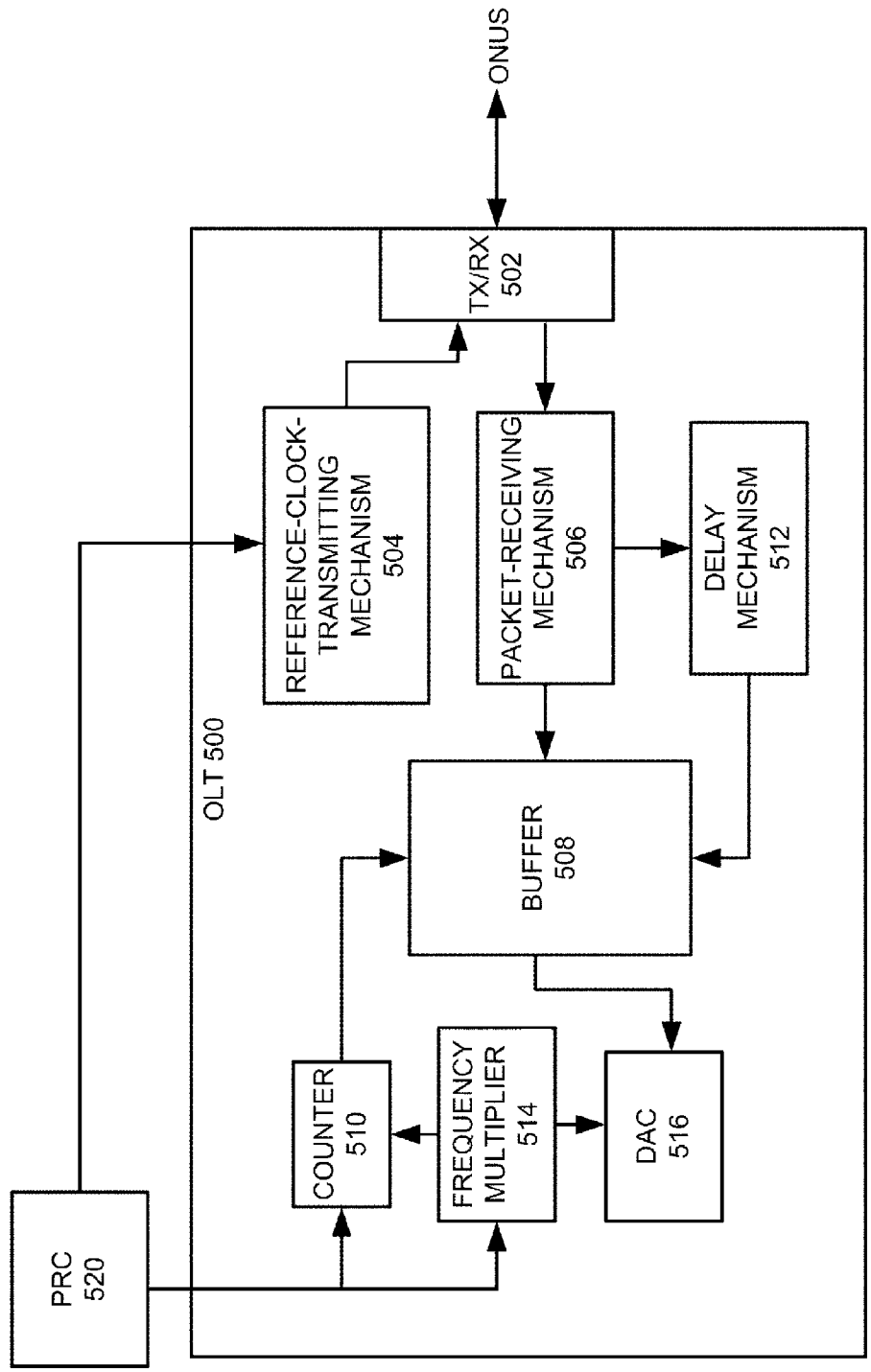

FIG. 5 presents a diagram illustrating the structure of an exemplary OLT in accordance with an embodiment of the present invention.

Figure 6:
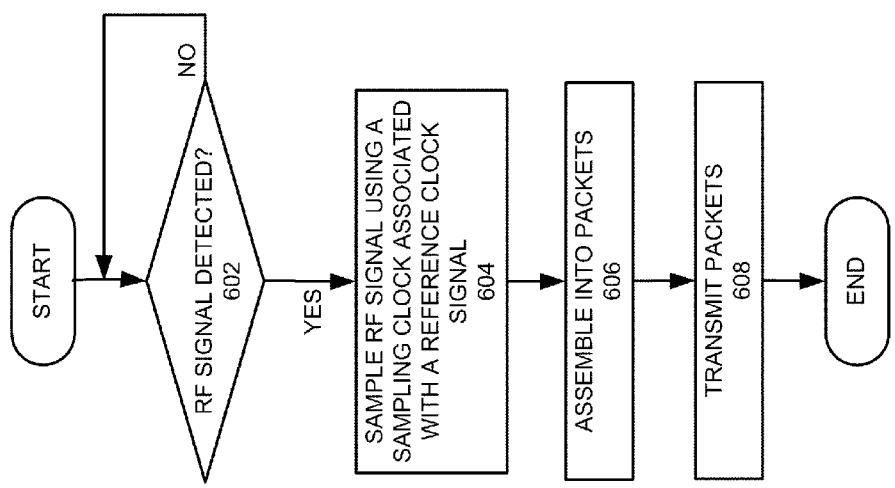

FIG. 6 presents a flowchart illustrating the process of transmitting an RF signal over an EPON in accordance with an embodiment of the present invention.

Figure 7:
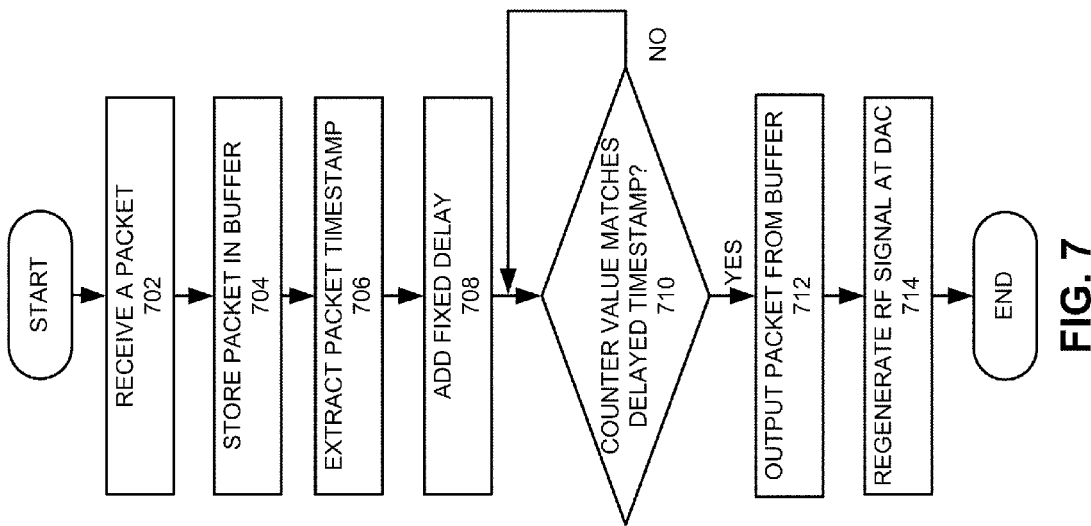

FIG. 7 presents a flowchart illustrating the process of receiving an RF signal over an EPON in accordance with an embodiment of the present invention.

In the figures, like reference numerals refer to the same figure elements.

DETAILED DESCRIPTION OF THE INVENTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system that can transport an upstream radio frequency (RF) signal over an Ethernet PON (EPON). In embodiments of the present invention, a centralized reference clock provides a frequency and phase-reference signal to an optical line terminal (OLT), which in turn transports the frequency and phase-reference signal to a downstream optical network unit (ONU). Upon detecting an incoming upstream radio frequency (RF) signal, the ONU digitizes the RF signal using a sampling signal derived from the frequency and phase-reference signal, and assembles the digitized signal into packets of predetermined size. In addition, the packets are timestamped by a timer, which in turn is generated/controlled by the frequency and phase-reference signal. The ONU then transmits the timestamped packets to the OLT. The OLT places the received packets into a buffer. The location of each packet within the buffer is decided by its timestamp value. Each packet in the buffer is read with a fixed delay from the time it was sampled, as shown by its timestamp. Therefore, regardless of the various transmission delays, all packets containing different portions of the digitized RF signal can be read from the buffer with correct timing. The buffer output is then sent to a digital-to-analog converter (DAC), which converts the digitized signal back to the RF domain using a clock signal derived from the same frequency and phase-reference signal.

EPON for MSOs

MSOs have relied on a hybrid fiber-coaxial (HFC) network to deliver services, such as analog TV, digital TV, video on demand, telephony, and high-speed data, to their subscribers. An HFC combines optical fiber and coaxial cable with optical fibers extended from the cable operators' master headend all the way to a fiber node serving hundreds of homes. Various types of services are encoded, modulated, and upconverted with RF carriers (which has a frequency range from 5 Mhz to 1000 MHz), and then combined into a single signal, which is subsequently transmitted over an optical fiber to the fiber node. The fiber node couples to the hundreds of homes via coaxial cables. In order to view the digitally modulated TV signals, set-top boxes are needed to convert the received RF signals into signals that are compatible with display devices, such as analog or digital televisions.

To provide increased bandwidth to the subscribers, MSOs can replace the coaxial cables connecting the fiber node and the subscribers' homes with optical fibers, and deliver the aforementioned various types of services, including TV and video on demand, via an EPON. However, because most current cable subscribers are equipped with set-top boxes capable of transmitting and receiving RF signals, to save cost it is desirable to provide both an RF forward path and a return path via the EPON. Note that a forward path is the downstream path from the headend to the home, whereas a return path is the upstream path from the home to the headend. The video content is carried to the subscribers on the forward path, and control signals, such as user command for ordering a pay-per-view movie, are carried on the return path.

Various approaches have been proposed to carry RF signals over an EPON. One such approach is the Radio Frequency over Glass (RFoG) solution, which uses an RFoG ONU to terminate the fiber connection and to convert the traffic for delivery over the in-home network. For example, video traffic can be fed over coaxial cables to the set-top box before reaching the television set. FIG. 2 presents a diagram illustrating an exemplary architecture of an RFoG ONU. RFoG ONU 200 includes a PON optical transceiver 202, an ONU chip 204, a physical layer (PHY) interface 206, a voice over Internet protocol (VoIP) module 208, an RF optical module 210, an RF amplifier 212, and an RF receiver 214.

PON optical transceiver 202 transmits and receives data and VoIP traffic in a conventional way, and communicates with ONU chip 204. ONU chip 204 processes the data and VoIP traffic, and interfaces with the subscriber's home equipment via appropriate interfaces. For example, PHY interface 206 is used for data traffic, and VoIP module 208 is used for VoIP traffic. Video signals, on the other hand, are transmitted and received by dedicated RF optical module 210. For the RF forward path (in the downstream direction), RF video signals are overlaid on (modulated on) an optical signal at a wavelength that is different from the data and VoIP traffic. For example, the data and VoIP traffic are carried at a wavelength of 1490 nm, and the RF video signals are overlaid to an optical signal at a wavelength of 1550 nm. For the RF return path (in the upstream direction), RF receiver 214 receives upstream RF signals, and sends the received RF signal to RF optical module 210, which converts the received RF signal to optical signals before transmitting them to the upstream OLT.

This RFoG approach enables the RF return path using a dedicated RF optical module for converting the RF signal to optical signals. Although compatible with all existing set-top boxes, this approach requires an additional laser on the ONU, and thus significantly increases the cost of the ONU.

A different approach for providing the RF return path is based on the MoCA (multimedia over coax alliance) technology, in which an MoCA module can be used to communicate between the set-top boxes and the ONU chip, thus converting upstream RF signals to EPON packets. However, this approach relies on MoCA-compatible equipment, such as MoCA set-top boxes.

To solve the problem of set-top box compatibility and to reduce cost while implementing EPON for MSOs, embodiments of the present invention leverage the fact that a precise phase-aligned reference clock signal can be transported from an OLT to an ONU. By sampling an upstream RF signal using a sampling clock associated with the transported reference clock at the ONU, and then regenerating the RF signal at the OLT using a similar sampling clock based in the same reference clock, the system can successfully transport the upstream RF signal across the EPON.

Clock Transport

This section briefly describes the method and apparatus for transporting a phase-aligned clock signal over an EPON. A more detailed description can be found in the disclosure of U.S. patent application Ser. No. 12/574,083, entitled "SYNCHRONIZATION TRANSPORT OVER PASSIVE OPTICAL NETWORKS," by inventors Edward W. Boyd and Hidehiko Shibuya, filed 6 Oct. 2009, which is incorporated by reference in its entirety herein.

FIG. 3 presents a diagram illustrating the architecture of an exemplary EPON for clock transport in accordance with an embodiment of the present invention. EPON 300 includes a precision reference clock (PRC) 302, an OLT 304, and an ONU 306. OLT 304 includes a multipoint control protocol (MPCP) timer 308, an Operations, Administration, and Management (OAM) module 310, and an optical transceiver 312. ONU 306 includes an optical transceiver 314, a pulse-time register 316, an MPCP timer 318, and a 1 pulse-per-second (1 PPS) pulse generator 320.

During operation, PRC 302 provides OLT 304 with a precision reference clock signal 301. In one embodiment, precision reference clock signal 301 is a 1 PPS signal. A given edge of each pulse of 1 PPS signal 301 is recorded by MPCP timer 308 based on the instant MPCP time. In one embodiment, the rising edge of the 1 PPS pulse signal is selected as the given edge. OAM module 310 generates an OAM message indicating a time the next pulse should occur. Transceiver 312 transmits the OAM message to ONU 306. ONU transceiver 314 receives the OAM message, and the next pulse time extracted from the OAM message is used to program pulse-time register 316.

According to the MPCP protocol, ONU-side MPCP timer 318 is synchronized to OLT-side MPCP timer 308 based on the timestamps in the MPCP control messages, such as MPCP GATE and REPORT. The MPCP time of EPON has a resolution of one time quantum (TQ), which is 16 ns. Consequently, the dynamic error of ONU-side MPCP timer 318 is effectively quantized and confined in two neighboring TQs.

1 PPS pulse generator 320 generates a 1 PPS pulse signal that is phase aligned with 1 PPS pulse signal 301 by aligning the same edge of its next pulse with the programmed pulse time (stored in pulse-time register 316) relative to ONU-side MPCP timer 318's counter value. Therefore, a phase-aligned clock signal is successfully transported over the EPON. Due to the incidental variable delay introduced by OLT 304, the ONU-generated pulse is located within ±8 TQ of the time of the source pulse. In addition to the 1 PPS pulse signal with a 50% duty cycle, other pulse formats are also possible as reference phase signals.

RF Signal Transport

Using the phase-aligned reference clock as a sampling clock, embodiments of the present invention provide a low-cost RF return path that is compatible with existing set-top boxes. FIG. 4 presents a diagram illustrating the structure of an exemplary ONU in accordance with an embodiment of the present invention.

ONU 400 includes an optical transceiver 402, a reference-clock-receiving mechanism 404, a frequency multiplier (or a frequency synthesizer) 406, an RF-signal-receiving mechanism 408, an analog-to-digital converter (ADC) 410, a counter 412, and a packet-assembling mechanism 414.

During operation, reference-clock-receiving mechanism 404 receives a phase-aligned reference clock signal from an upstream OLT via optical transceiver 402. In one embodiment, the phase-aligned reference clock signal is a 1 PPS pulse signal. The received reference clock signal is then sent to frequency multiplier 406 to generate a signal with a higher frequency. In one embodiment, frequency multiplier 406 is an oscillator numerically controlled by the received reference clock signal. In a further embodiment, the output frequency of frequency multiplier 406 can be programmable. For example, the output frequency of frequency multiplier 406 can be programmed at 10 MHz.

RF-signal-receiving mechanism 408 receives an upstream RF signal. In one embodiment, the received RF signal is sent from a conventional set-top box. In a further embodiment, the set-top box includes a cable modem. The received RF signal is then sent to ADC 410. ADC 410 digitizes the received RF signal using a sampling signal which is the output of frequency multiplier 406. Note that frequency multiplier 406 can generate a sampling signal that is optimized to match the carrier frequency of the RF signal (for example based on the frequency used by the STB to generate such RF signal). This feature can minimize the bandwidth required to transport the digitized RF signal over the upstream link. Otherwise, if a higher sampling frequency is used, the system might generate more data packets than necessary.

The digitized RF signal is then sent to packet-assembling mechanism 414 to be assembled into EPON packets of suitable block sizes. In one embodiment, the packet size is configurable by users. Each assembled packet is timestamped by counter 412, which is driven by the output of frequency multiplier 406, and is reset by the received reference clock signal. The timestamp (e.g., a counter value) of a packet records the start time of the sampling process of the packet. In one embodiment, the timestamp is included in the header of the packet. The timestamped EPON packets containing the digitized RF signal are then transmitted to the upstream OLT via optical transceiver 402.

FIG. 5 presents a diagram illustrating the structure of an exemplary OLT in accordance with an embodiment of the present invention. OLT 500 includes an optical transceiver 502, a reference-clock-transmitting mechanism 504, a packet-receiving mechanism 506, a buffer 508, a counter 510, a delay mechanism 512, a frequency multiplier 514, and a digital-to-analog converter (DAC) 516.

During operation, reference-clock-transmitting mechanism 504 broadcasts a phase-aligned clock reference signal driven by a PRC 520 to downstream ONUs via optical transceiver 502. As discussed previously, the phase-aligned reference clock is used to generate a sampling clock, and to timestamp packets containing the digitized RF signal. Packet-receiving mechanism 506 receives packets containing digitized RF signals from a downstream ONU via OLT-side optical transceiver 502. The received packets are stored in buffer 508. In one embodiment, the positions of the packets within the buffer are determined by their timestamps. In addition to providing a phase-aligned reference clock to downstream ONUs, the output of PRC 520 is also sent to an OLT-side frequency multiplier 514 and an OLT-side counter 510. The operations of counter 510 and frequency multiplier 514 are similar to the ones located on the ONU. OLT-side counter 510 is driven by the output of frequency multiplier 514, and reset by PRC 520. Therefore, the OLT-side counter 510 is synchronized to the ONU-side counter 412.

Packet-receiving mechanism 506 extracts the timestamp of each received packet and sends the extracted time value to delay mechanism 512, which adds a fixed amount of delay to the time value. In one embodiment, the fixed delay exceeds the maximum possible delay affecting the furthest ONU. When the value of counter 510 matches the delayed timestamp of a packet (which is output by delay mechanism 512), the packet is read out of buffer 508. Such an approach guarantees that all packets are replayed (read out of buffer 508) at OLT 500 after the same amount of delay regardless of the delays experienced by different packets during transmission. By introducing a fixed delay, the system overcomes time jitters and random delays from all packets and ensures proper timing of the digital values of the RF signal.

In one embodiment of the present invention, each ONU is allocated a time slot for transmission of digitized RF signals, thus avoiding collision. The time-slot-allocation mechanism can be similar to that of a conventional bandwidth allocation for the ONU upstream transmission. In one embodiment of the present invention, no scheduling or bandwidth allocation is implemented for the RF return path. If two ONUs are sending out digitized RD signals at the same time, then a collision happens. In one embodiment, packet-receiving mechanism 506 is further configured to detect RF signal collision by examining the extracted timestamps. If packets sent from different ONUs have overlap timestamps, packet-receiving mechanism 506 can determine that a collision has occurred. Packet-receiving mechanism 506 can notify the collided ONUs that the transmission has failed and request retransmission. In a further embodiment, the collided ONUs can wait for a random time period before retransmitting the digitized RF signals.

After the received packets containing the digitized RF signals are read out of buffer 508, they are sent to DAC 516 for digital-to-analog conversion. DAC 516 uses the output of frequency multiplier 514 as a clock signal when converting the packets back to the RF domain. Because the output of the OLT-side frequency multiplier 514 is synchronized with that of the ONU-side frequency multiplier 406, which is used for sampling the RF signal, DAC 516 is able to regenerate the original RF signal. In one embodiment, the output of buffer 508 is digitally interpolated before being sent to DAC 516. In such a case, frequency multiplier 514 has a higher frequency output than that of the ONU-side frequency multiplier 406. Hence, the regenerated RF signal has a better signal quality.

FIG. 6 presents a flowchart illustrating the process of transmitting an RF signal over an EPON in accordance with an embodiment of the present invention. During operation, an ONU system determines whether an RF signal is detected (operation 602). If not, the system continues waiting. If so, the system samples the received RF signal using a sampling clock based on a phase-aligned reference clock signal (operation 604). Subsequently, the system assembles the digital samples into packets of certain block size (operation 606). In one embodiment, the digital samples are assembled into Ethernet packets including appropriate Ethernet headers. The packets are then transmitted to upstream OLTs (operation 608).

FIG. 7 presents a flowchart illustrating the process of receiving an RF signal over an EPON in accordance with an embodiment of the present invention. During operation, an OLT receives a packet containing a digitized RF signal (operation 702), and stores the packet in a buffer (operation 704). The system extracts a timestamp of the received packet (operation 706), and adds a fixed delay to the timestamp (operation 708). Subsequently, the system compares the value of a local counter with the value of the delayed timestamp (operation 710). If there is a match, the packet is read out of the buffer at a time corresponding to the added delay (operation 712). Otherwise, the system waits for a match. The buffer output is then sent to a DAC to be converted back to the RF domain (operation 714).

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. An optical network unit (ONU) for transporting radio frequency (RF) signals in an Ethernet passive optical network (EPON), comprising:
   a reference-clock-receiving mechanism configured to receive a frequency and phase-reference signal from an optical line terminal (OLT);
   an RF-signal-receiving mechanism configured to receive an RF signal;
   an analog-to-digital converter (ADC) configured to convert the RF signal into a digital signal using a sampling signal associated with the frequency and phase-reference signal;
   a packet-assembling mechanism configured to assemble at least a portion of the digital signal into a packet;
   a timestamping mechanism configured to timestamp the packet; and
   an optical transceiver configured to transmit the packet to the OLT, thereby facilitating RF signal transport over the EPON.

2. The ONU of claim 1, wherein the frequency and phase-reference signal is a 1 pulse-per-second (1 PPS) clock signal.

3. The ONU of claim 1, further comprising:
   a frequency multiplier configured to multiply the frequency and phase-reference signal to generate the sampling signal provided to the ADC.

4. The ONU of claim 3, wherein the sampling signal is optimized to match a carrier frequency of the RF signal.

5. The ONU of claim 1, wherein the timestamping mechanism comprises:
   a counter configured to be reset by the frequency and phase-reference signal.

6. The ONU of claim 1, wherein receiving the frequency and phase-reference signal from the OLT involves receiving an OAM message.

7. The system of claim 1, wherein the frequency and phase-reference signal is a 1 pulse-per-second (1 PPS) clock signal.

8. The system of claim 1, wherein the ONU further comprises:
   a frequency multiplier configured to multiply the frequency and phase-reference signal in order to generate the sampling signal provided to the ADC.

9. The system of claim 1, wherein the OLT further comprises:
   a frequency multiplier configured to multiply the frequency and phase-reference signal in order to generate the clock signal provided to the DAC.

10. The system of claim 1, wherein receiving the frequency and phase-reference signal from the OLT involves receiving an Operations, Administration, Management (OAM) message.

11. An optical line terminal (OLT) for transporting radio frequency (RF) signals in an Ethernet passive optical network (EPON), comprising:
   a reference-clock-transmitting module configured to transmit a frequency and phase-reference signal to an optical network unit (ONU);
   a packet-receiving mechanism configured to receive a packet that includes a digitized RF signal from the ONU;
   a buffer configured to buffer the received packet;
   a delay mechanism configured to delay reading the received packet from the buffer for a predetermined amount of time; and
   a digital-to-analog converter (DAC) configured to convert the digitized RF signal included in the packet back to an RF domain using a clock signal associated with the frequency and phase-reference signal, thereby facilitating RF signal transport over the EPON.

12. The OLT of claim 11, wherein the frequency and phase-reference signal is a 1 pulse-per-second (1 PPS) clock signal.

13. The OLT of claim 11, wherein the OLT further comprises:
   a frequency multiplier configured to multiply the frequency and phase reference signal to generate the clock signal provided to the DAC.

14. The OLT of claim 11, wherein the received packet is placed at a location within the buffer based on a timestamp of the packet.

15. The OLT of claim 11, further comprising:
   a counter configured to be reset by the frequency and phase-reference signal, wherein the received packet is read from the buffer when the counter value equals to a summation of the packet timestamp and the predetermined amount of time delay.

16. The OLT of claim 11, wherein the predetermined amount of time delay exceeds a maximum transmission delay between the ONU and the OLT.

17. The OLT of claim 11, wherein transmitting the frequency and phase-reference signal to the ONU involves receiving an Operations, Administration, and Management (OAM) message.

18. An Ethernet passive optical network (EPON) system for transporting radio frequency (RF) signals, comprising:
   a reference clock configured to generate a frequency and phase-reference signal;
   an optical network unit (ONU), the ONU comprising:
   a reference-clock receiving mechanism configured to receive the frequency and phase-reference signal from an optical line terminal (OLT);
   an RF-signal-receiving mechanism configured to receive an RF signal;
   an analog-to-digital converter (ADC) configured to convert the RF signal into a digital signal using a sampling signal associated with the frequency and phase-reference signal;
   a packet-assembling mechanism configured to assemble at least a portion of the digital signal into a packet;
   a timestamping mechanism configured to timestamp the packet; and
   an optical transceiver configured to transmit the packet to the OLT;
   wherein the OLT is coupled to the reference clock, the OLT comprising:
   a packet-receiving mechanism configured to receive the packet from the ONU;
   a buffer configured to buffer the received packet;
   a delay mechanism configured to delay reading the received packet from the buffer for a predetermined amount of time; and
   a digital-to-analog converter (DAC) configured to convert the digital signal included in the packet back to an RF domain using a clock signal associated with the frequency and phase-reference signal, thereby facilitating RF signal transport over the EPON.

19. The system of claim 18, wherein the timestamping mechanism comprises:

a counter configured to be reset by the frequency and phase-reference signal.

20. The system of claim 18, wherein the received packet is placed at a location within the buffer based on the timestamp.

21. The system of claim 18, wherein the received packet is read from the buffer at a time based on the packet timestamp and the predetermined amount of time delay.

22. The system of claim 18, wherein the predetermined amount of time delay exceeds a maximum transmission delay between the ONU and the OLT.

* * * * *